United States Patent
Hua et al.

(10) Patent No.: US 12,549,303 B2
(45) Date of Patent: Feb. 10, 2026

(54) SIGNAL CONFIGURATION METHOD, APPARATUS AND DEVICE, AND STORAGE MEDIUM

(71) Applicant: ZTE CORPORATION, Shenzhen (CN)

(72) Inventors: Jian Hua, Shenzhen (CN); Yu Xin, Shenzhen (CN); Tong Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 346 days.

(21) Appl. No.: 18/253,722

(22) PCT Filed: Sep. 10, 2021

(86) PCT No.: PCT/CN2021/117713
§ 371 (c)(1),
(2) Date: May 19, 2023

(87) PCT Pub. No.: WO2022/110973
PCT Pub. Date: Jun. 2, 2022

(65) Prior Publication Data
US 2024/0014967 A1    Jan. 11, 2024

(30) Foreign Application Priority Data
Nov. 25, 2020    (CN) .................. 202011345206.X

(51) Int. Cl.
*H04L 5/00*    (2006.01)
*H04L 27/26*   (2006.01)

(52) U.S. Cl.
CPC ........ *H04L 5/0048* (2013.01); *H04L 27/2634* (2013.01)

(58) Field of Classification Search
CPC ............. H04L 27/2605; H04L 27/2613; H04L 27/2634; H04L 5/0007; H04L 5/0048; H04L 5/0051; H04L 5/006
See application file for complete search history.

(56) References Cited

U.S. PATENT DOCUMENTS

| | | | |
|---|---|---|---|
| 2020/0052944 A1* | 2/2020 | Zhang | ................... H04L 5/0007 |
| 2020/0076647 A1* | 3/2020 | Zhang | ................... H04L 1/0003 |

(Continued)

FOREIGN PATENT DOCUMENTS

| | | |
|---|---|---|
| CN | 108809598 A | 11/2018 |
| CN | 109586868 A | 1/2019 |

(Continued)

OTHER PUBLICATIONS

English translation of International Search Report (ISR) of PCT/CN2021/117713; Dec. 8, 2021 (Year: 2021).*

(Continued)

*Primary Examiner* — Benjamin H Elliott, IV
(74) *Attorney, Agent, or Firm* — Morgan, Lewis & Bockius LLP

(57) ABSTRACT

Provided are a signal configuration method, apparatus, device, and a storage medium. The method includes unevenly configuring at least two phase tracking reference signal (PTRS) blocks in a time domain symbol, where each PTRS block includes one or more PTRSs; and sending the configured PTRS blocks to a second node.

17 Claims, 4 Drawing Sheets

(56) References Cited

U.S. PATENT DOCUMENTS

| | | | | |
|---|---|---|---|---|
| 2020/0092032 A1* | 3/2020 | Zhang | .................... | H04W 72/23 |
| 2020/0153585 A1* | 5/2020 | Wu | ....................... | H04L 27/2688 |
| 2020/0304259 A1* | 9/2020 | Ihalainen | .............. | H04L 5/0051 |
| 2020/0403748 A1* | 12/2020 | Yokomakura | ......... | H04L 5/0048 |
| 2022/0200755 A1* | 6/2022 | Lee | ........................ | H04L 5/0048 |
| 2023/0198715 A1* | 6/2023 | Liu | ........................ | H04L 5/0023 |
| | | | | 370/329 |
| 2023/0370226 A1* | 11/2023 | Kumar | .................. | H04L 5/0051 |
| 2024/0014967 A1* | 1/2024 | Hua | ....................... | H04L 5/0048 |

FOREIGN PATENT DOCUMENTS

| | | |
|---|---|---|
| CN | 111092838 A | 5/2020 |
| CN | 112564878 A | 3/2021 |

OTHER PUBLICATIONS

"Key Distribution Scheme Based on Uneven PSK Modulation Using Phase Noise"; Dong et al.; 2020 Opto-Electronics and Communications Conference (OECC); Oct. 4, 2020 (Year: 2020).*
International Search Report in Application No. PCT/CN2021/117713 dated Dec. 8, 2021, 4 pages, including translation.
Huawei et al., "Remaining issue of PTRS", 3GPP TSG RAN WGI Meeting #91, R1-1719440, Dec. 1, 2017, 9 pages.
Extended European Search Report in Application No. 21896477.3, dated Oct. 11, 2024, 30 pages.
CMCC, "Discussion on PT-RS design", 3GPP TSG RAN WG1 Meeting 90bis, R1-1717882, Prague, CZ, $9^{th}$-$13^{th}$, Oct. 2017.

* cited by examiner

ED STATES PATENT

SIGNAL CONFIGURATION METHOD, APPARATUS AND DEVICE, AND STORAGE MEDIUM

CROSS REFERENCE TO RELATED APPLICATIONS

This is a National Stage Application filed under 35 U.S.C. 371, based on International Patent Application No. PCT/CN2021/117713, filed on Sep. 10, 2021, which claims priority to Chinese Patent Application No. 202011345206.X filed with the China National Intellectual Property Administration (CNIPA) on Nov. 25, 2020, the disclosures of which are incorporated herein by reference in their entireties.

TECHNICAL FIELD

The present application relates to the technical field of communications and, specifically, to a signal configuration method, apparatus, and device, and a storage medium.

BACKGROUND

In a high-frequency scenario, phase noise is relatively large, so the estimation accuracy of phase noise needs to be improved. A phase tracking reference signal (PTRS) configuration method in the 5G related art is only designed for scenarios below 52.6 G and cannot meet the requirements of high-frequency scenarios.

SUMMARY

The present application provides a signal configuration method, apparatus, and device, and a storage medium to improve the estimation accuracy of phase noise in high-frequency scenarios.

In a first aspect, an embodiment of the present application provides a signal configuration method. The method is applied by a first node. The method includes unevenly configuring at least two phase tracking reference signal (PTRS) blocks in a time domain symbol, where each PTRS block includes one or more PTRSs; and sending configured PTRSs to a second node.

In a second aspect, an embodiment of the present application provides a signal configuration apparatus. The apparatus is configured at a first node. The apparatus includes a configuration module and a sending module.

The configuration module is configured to unevenly configure at least two phase tracking reference signal (PTRS) blocks in a time domain symbol. Each PTRS block includes one or more PTRSs.

The sending module is configured to send configured PTRSs to a second node.

In a third aspect, an embodiment of the present application provides a signal configuration device. The device includes one or more processors and a memory.

The memory is configured to store one or more programs.

When executed by the one or more processors, the one or more programs cause the one or more processors to implement the method provided in any embodiment of the present application.

In a fourth aspect, an embodiment of the present application provides a storage medium. The storage medium stores a computer program which, when executed by a processor, implements the method provided in any embodiment of the present application.

According to the signal configuration method, apparatus, and device, and the storage medium provided in embodiments of the present application, at least two phase tracking reference signal (PTRS) blocks are unevenly configured in the time domain symbol, where each PTRS block includes one or more PTRSs; and the configured PTRS blocks are sent to the second node. Thus, the effect of phase noise is suppressed without affecting the spectral efficiency of a system and with a low peak-to-average power ratio (PAPR).

The preceding embodiments and other aspects of the present application and implementations thereof are described in more detail in the brief description of drawings, detailed description, and claims.

DETAILED DESCRIPTION

Figure 1:
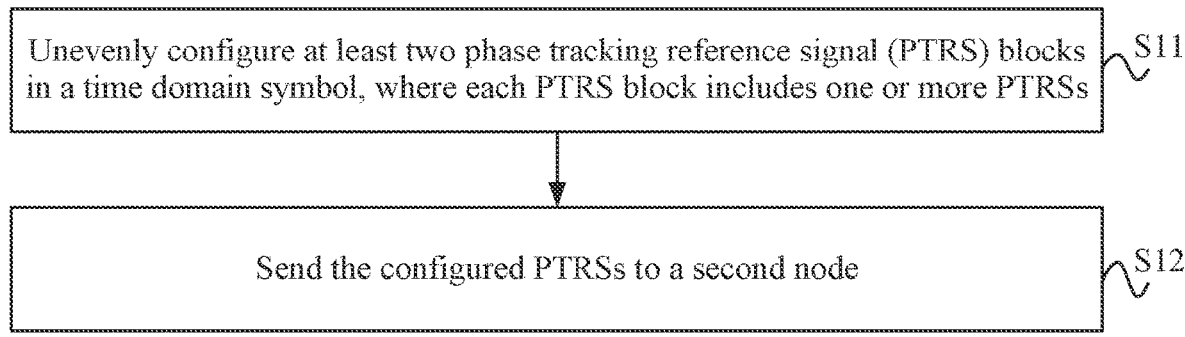
FIG. 1 is a flowchart of a PTRS configuration method according to an embodiment of the present application.

Embodiments of the present application are described hereinafter in detail in conjunction with drawings.

The steps illustrated in the flowcharts among the drawings may be executed by, for example, a computer system capable of executing a set of computer-executable instructions. Moreover, although logical sequences are illustrated in the flowcharts, the steps illustrated or described may be executed in sequences different from those described here in some cases.

A controller provided in this embodiment can execute a code rate adjustment method provided in any embodiment of the present application and has corresponding functional modules for executing the method. For technical details not described in detail in this embodiment, reference may be made to the code rate adjustment method provided in any embodiment of the present application.

It is to be noted that units and modules involved in the embodiments of the code rate adjustment apparatus are just divided according to functional logic, and the division is not limited to this, as long as the corresponding functions can be implemented. In addition, specific names of functional units are just intended for distinguishing and are not to limit the protection scope of the present application.

The technical solutions of the present application may be applied to various communication systems such as the Global System for Mobile Communications (GSM), the code-division multiple access (CDMA) system, the wideband code-division multiple access (WCDMA) system, General Packet Radio Service (GPRS), the Long Term Evolution (LTE) system, the Long Term Evolution Advanced (LTE-A) system, the Universal Mobile Telecommunications System (UMTS), and the 5th generation mobile communication (5G) system. The embodiments of the present application are not limited thereto. In the present application, a 5G system is used as an example.

In the embodiments of the present application, a base station may be a device capable of communicating with a user terminal. The base station may be any device having a wireless transceiving function. The base station includes, but is not limited to, a base station NodeB, an evolved base station eNodeB, a base station in the 5G communication system, a base station in a future communication system, an access node in a WiFi system, a wireless relay node, and a wireless backhaul node. The base station may also be a radio controller in a cloud radio access network (C-RAN) scenario, a small station, or a transmission reference point (TRP). The embodiments of the present application are not limited thereto. In the present application, a 5G base station is used as an example.

In the embodiments of the present application, the user terminal is a device having a radio transceiving function. The device may be deployed on land, including indoor or outdoor environments, and may be handled, worn, or vehicle-mounted: may also be deployed on water (such as in ships); and may also be deployed in the air (such as in airplanes, balloons, and satellites). The user terminal may be a mobile phone, a tablet computer, a computer having a wireless transceiving function, a virtual reality (VR) terminal, an augmented reality (AR) terminal, a wireless terminal in industrial control, a wireless terminal in self-driving, a wireless terminal in remote medicine, a wireless terminal in a smart grid, a wireless terminal in transportation safety, a wireless terminal in a smart city, or a wireless terminal in smart home. The application scenarios are not limited in the embodiments of the present application. The user terminal may also sometimes be called a terminal, an access terminal, a UE unit, a UE station, a mobile station, a mobile platform, a remote station, a remote terminal, a mobile device, a UE terminal, a wireless communication device, a UE agent, or a UE apparatus. This is not limited in the embodiments of present application.

In a high-frequency scenario, phase noise is relatively large. Even if phase compensation is made at a receiving end, there is a lot of residual phase noise. At the same time, in the high-frequency scenario, the Doppler shift is relatively large. Even if frequency offset compensation is made at the receiving end, some phase offset can remain in data symbols. Especially for some low-level terminals, phase noise is larger due to the low cost and poor performance of devices.

In addition, in the high-frequency scenario, due to relatively large path losses and shadow fading, some areas at the edge of a cell have a very low signal-to-noise ratio. Moreover, a power amplifier (PA) has relatively low efficiency at high frequencies. To improve the signal-to-noise ratio and save the power consumption of a battery in a user equipment (UE), the UE needs to transmit a signal with a relatively low peak-to-average power ratio (PAPR). At present, in 5G NR standard, to send a signal with a lower PAPR, a discrete Fourier transform-spread orthogonal frequency-division multiplexing (DFT-s-OFDM) waveform is generally used. Since the data of the signal is mapped in the time domain, the PAPR is lower than cyclic prefix-orthogonal frequency-division multiplexing (CP-OFDM).

At present, PTRSs of a single carrier in NR protocol are mainly configured by evenly inserting packets. The configuration manner is relatively simplistic. In conclusion, it is necessary to consider how to suppress the influence of the phase noise without affecting the spectral efficiency of a system and making the PAPR low: Therefore, it is necessary to design a new PTRS configuration scheme to solve this problem.

For the preceding problem, the embodiments of the present application provide the following technical solutions.

In an embodiment, a PTRS configuration method is provided. The PTRS configuration method is applicable to the case where phase noise is suppressed in a high-frequency scenario. As shown in FIG. 1, a signal configuration method provided in this embodiment of the present application mainly includes S11 and S12.

In S11, at least two phase tracking reference signal (PTRS) blocks are unevenly configured in a time domain symbol. Each PTRS block includes one or more PTRSs.

In S12, the configured PTRSs are sent to a second node.

In this embodiment, the preceding first node refers to a sending end in the 5G system. The sending end may be any one of the preceding base stations or any one of the user equipments. The second node refers to the receiving end in the 5G system. The receiving end may be any one of the preceding base stations or any one of the user equipments.

In an example embodiment, the at least two phase tracking reference signal (PTRS) blocks include a first PTRS block and a second PTRS block.

In an example embodiment, the at least two phase tracking reference signal (PTRS) blocks include a first PTRS block, a second PTRS block, and a third PTRS block.

In this embodiment, a PTRS block refers to a signal block composed of multiple consecutive PTRSs or may be referred to as a PTRS group. Further, the first PTRS block may be understood as a head PTRS block, that is, a series of consecutive PTRSs configured at the head of the time domain symbol. The second PTRS block may be understood as a tail PTRS block, that is, a series of consecutive PTRSs configured at the tail of the time domain symbol. The third PTRS block may be understood as an intermediate PTRS block, that is, a series of consecutive PTRSs configured in the middle of the time domain symbol.

In an embodiment, the head PTRS block and the tail PTRS block are unevenly configured in the time domain symbol.

In another embodiment, the head PTRS block, the intermediate PTRS block, and the tail PTRS block are unevenly configured in the time domain symbol. That is, the intermediate PTRS block may be configured or not configured according to the actual situation.

In an example embodiment, the first PTRS block is configured at the head of the time domain symbol. The second PTRS block is configured at the tail of the time domain symbol.

In an example embodiment, PTRSs in the first PTRS block and PTRSs in the second PTRS block are both consecutively arranged.

In an example embodiment, when multiple time domain symbols are included in a preset time domain range, the first PTRS block in each time domain symbol includes the same PTRS sequence. The second PTRS block in each time domain symbol includes the same PTRS sequence.

In an example embodiment, the PTRS sequence in the first PTRS block is the same as the head sequence of a time domain reference signal. The PTRS sequence in the second PTRS block is the same as the tail sequence of the time domain reference signal.

In an example embodiment, when the time domain reference signal is defined in a frequency domain, the PTRS sequence in the first PTRS block is the same as the head sequence of a time domain reference signal obtained by performing an inverse fast Fourier transform (IFFT) on a frequency domain reference signal. The PTRS sequence in the second PTRS block is the same as the tail sequence of the time domain reference signal obtained by performing an IFFT on the frequency domain reference signal.

PTRSs are placed unevenly in the time domain. PTRSs in each symbol are divided into a head PTRS block, an intermediate PTRS block, and a tail PTRS block. Further, the head PTRS block and the tail PTRS block in each symbol are consecutively arranged. Further, in a certain range, the head PTRS block in each symbol includes the same sequence. The tail PTRS block in each symbol includes the same sequence. The intermediate PTRS block in each symbol includes a different sequence. In this manner, the advantage is that, when PTRS can be used for phase noise estimation, the effect of the cyclic prefix (CP) can be achieved by using the head sequence and the tail sequence to resist the multipath delay:

In an example embodiment, the number of PTRSs in the first PTRS block is proportional to the length of a time domain symbol. The number of PTRSs in the second PTRS block is determined by the fading channel multipath delay.

The number of head PTRSs is proportional to the length of a symbol. The number of tail PTRSs is related to the fading channel multipath delay. In this manner, head PTRSs and tail PTRSs having a CP effect can be configured according to the channel environment.

In an example embodiment, the number of PTRSs in the second PTRS block is greater than the number of PTRSs in the first PTRS block.

In an example embodiment, the PTRSs in the third PTRS block are discretely distributed in the data of the time domain symbol.

In an example embodiment, PTRSs in the third PTRS block are evenly distributed in the data of the time domain symbol other than the first PTRS block and the second PTRS block.

In an example embodiment, in the case where the third PTRS block includes multiple PTRSs, one or more sub-blocks of the same length are included in the third PTRS block. Each sub-block includes one or more PTRSs.

The one or more sub-blocks are evenly distributed in time domain data.

In an example embodiment, the number of sub-blocks included in one third PTRS block and the number of PTRSs in each sub-block are determined by one or more parameters of the following: the magnitude of phase noise to which data is subjected, the change rate of phase noise to which data is subjected, the magnitude of white Gaussian noise to which data is subjected, or the change rate of white Gaussian noise to which data is subjected.

The number of divided sub-blocks A of the intermediate PTRS block and the number of PTRSs in each sub-block B are each a certain set value. The set value is generally related to the magnitude and change rate of phase noise to which the data is subjected and the magnitude and change rate of white Gaussian noise to which the data is subjected. In this manner, PTRSs can be flexibly configured according to the phase noise and the additive white Gaussian noise (AWGN) in the actual environment. Thus, the phase noise can be well compensated while high resource utilization rate is ensured.

In an example embodiment, the PTRS sequence modulation manner in the third PTRS block is the same as the data modulation manner in the time domain symbol.

The head PTRS sequence and the tail PTRS sequence are the same as a reference signal sequence. The modulation manner of the intermediate PTRS sequence is the same as the modulation manner of the data symbol. In this manner, the advantage is that the overall PAPR can be reduced.

In an example embodiment, the modulation manner includes one or more of the following: a binary phase-shift keying (BPSK) modulation manner, a pi/2 BPSK modulation manner, a quadrature phase-shift keying (QPSK) modulation manner, or a 16 quadrature amplitude modulation (16-QAM) manner.

If the reference signal is defined in the frequency domain, the head PTRS sequence and the tail PTRS sequence are the same as the head sequence and tail sequence of the time domain reference signal obtained by performing an IFFT on the reference signal in the frequency domain. Further, the modulation manner of the data symbol is pi/2 BPSK, BPSK, QPSK, 16-QAM, or the like. The modulation manner of the intermediate PTRS sequence is pi/2 BPSK, BPSK, QPSK, or 16-QAM.

In this manner, the low PAPR characteristic of the original modulation manner is not destroyed because the PTRS is inserted in the middle of the data.

According to the phase tracking reference signal configuration method provided in this embodiment of the present application, at least two phase tracking reference signal (PTRS) blocks are unevenly configured in the time domain symbol, where each PTRS block includes one or more PTRSs; and the configured PTRS blocks are sent to the second node. Thus, the effect caused by phase noise is suppressed without affecting the spectral efficiency of a system and with a low peak-to-average power ratio (PAPR).

Figure 2:
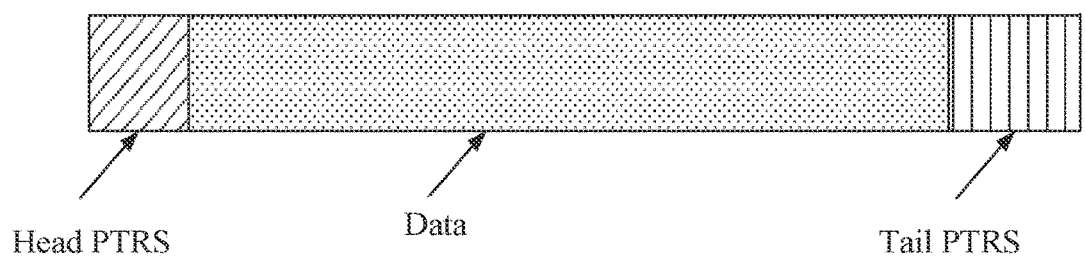
FIG. 2 is a diagram showing the configuration scheme of PTRSs of one orthogonal frequency division multiplexing (OFDM) symbol according to an embodiment of the present application.

In an applicable embodiment. FIG. 2 is a diagram showing the configuration scheme of PTRSs of one OFDM symbol according to an embodiment of the present application. Since an experienced channel is a fading channel having a certain multipath delay, and there is certain phase noise at a sending end and a receiving end, a consecutive section of PTRS is configured at each of the head and the tail, respectively. The intermediate portion is data, and no intermediate PTRS is configured. Moreover, the configuration of other OFDM symbols in the same slot is the same as the above configuration. The head of each symbol has exactly the same PTRS sequence, and the tail of each symbol has exactly the same PTRS sequence.

Figure 3:
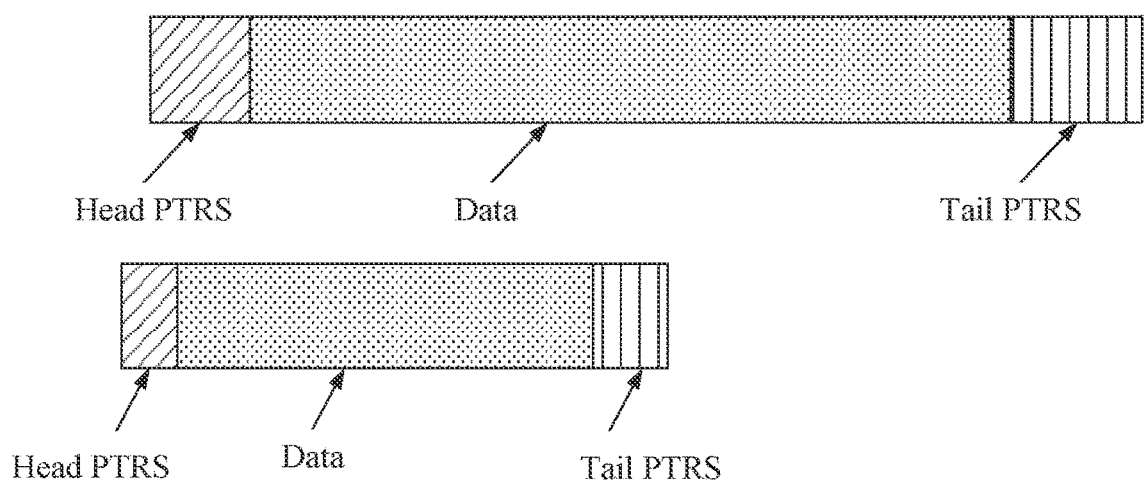
FIG. 3 is a diagram showing the configuration scheme of PTRSs of two OFDM symbols in different slots according to an embodiment of the present application.

In an applicable embodiment. FIG. 3 is a diagram showing the configuration scheme of PTRSs of two OFDM symbols in different slots according to an embodiment of the present application. Since the experienced channel is a fading channel having a certain multipath delay, and there is certain phase noise at a sending end and a receiving end, a consecutive section of PTRS is configured at each of the head and the tail, respectively. The intermediate portion is data, and no intermediate PTRS is configured. Moreover, the configuration of other OFDM symbols in the same slot is the same as the above configuration. The head of each symbol has exactly the same PTRS sequence, and the tail of each symbol has exactly the same PTRS sequence. Since the length of the OFDM symbol in a first slot is twice that in a second slot, the length of the head PTRS of the first OFDM symbol is also set to twice the head PTRS of the second OFDM symbol. The tail of the first OFDM symbol remains the same as the tail of the second OFDM symbol.

Figure 4:
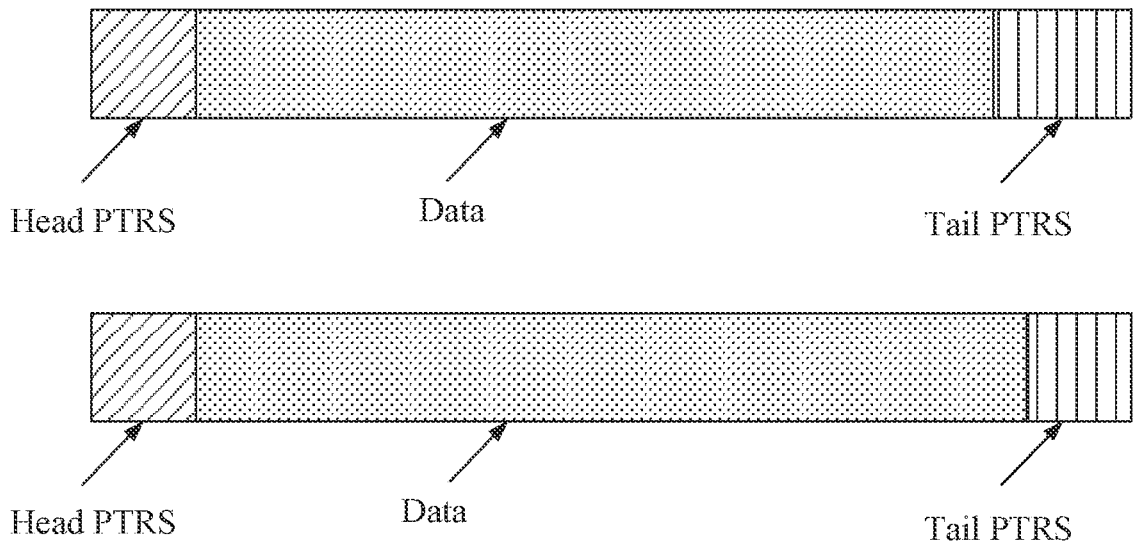
FIG. 4 is a diagram showing the configuration scheme of PTRSs of two OFDM symbols in different slots according to an embodiment of the present application.

In an applicable embodiment. FIG. 4 is a diagram showing the configuration scheme of PTRSs of two OFDM symbols in different slots according to an embodiment of the present application. Since an experienced channel is a fading channel having a certain multipath delay, and there is certain phase noise at a sending end and a receiving end, a consecutive section of PTRS is configured at each of the head and the tail, respectively. The intermediate portion is data, and no intermediate PTRS is configured. Moreover, the configuration of other OFDM symbols in the same slot is the same as the above configuration. The head of each symbol has exactly the same PTRS sequence, and the tail of each symbol has exactly the same PTRS sequence. Since the multipath delay of the channel experienced by the OFDM symbol in a first slot and the multipath delay of the channel experienced by the OFDM symbol in a second slot are different, that is, the multipath delay of the former is greater than that of the latter, the length of the tail PTRS of the first OFDM symbol is set to be greater than the length of the tail of the second OFDM symbol. The head of the first OFDM symbol remains the same as the head of the second OFDM symbol.

Figure 5:
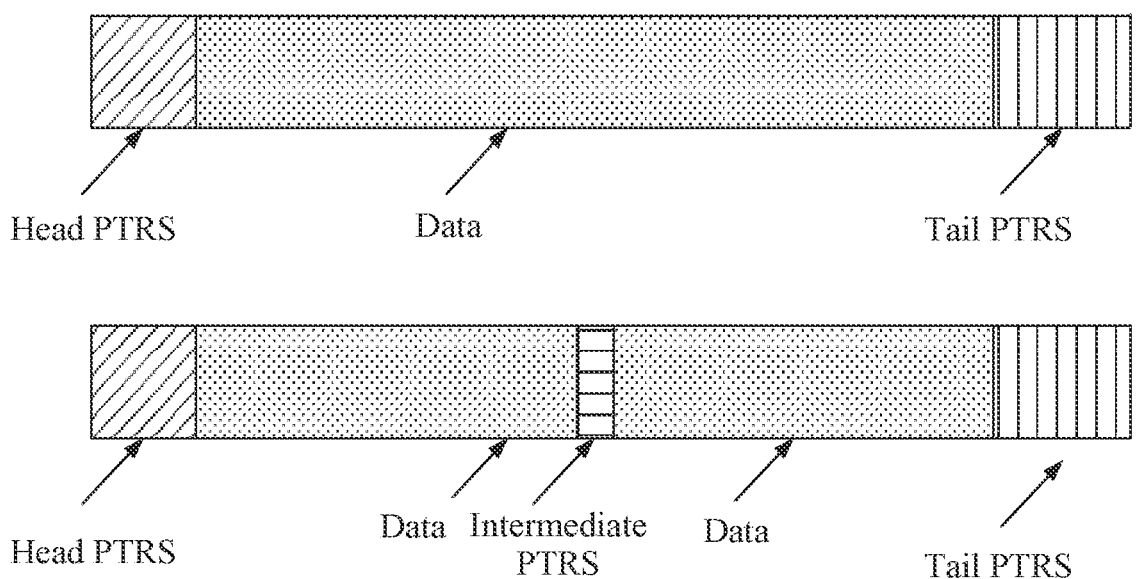
FIG. 5 is a diagram showing the configuration scheme of PTRSs of two OFDM symbols in different slots according to an embodiment of the present application.

In an applicable embodiment. FIG. 5 is a diagram showing the configuration scheme of PTRSs of two OFDM symbols in different slots according to an embodiment of the present application. Since an experienced channel is a fading channel having a certain multipath delay, and there is certain phase noise at a sending end and a receiving end, a consecutive section of PTRS is configured at each of the head and the tail, respectively. A first OFDM symbol has data in the middle, and no intermediate PTRS is configured. There is one intermediate PTRS block in the middle of a second OFDM symbol, that is. A=1. Moreover, the configuration of other OFDM symbols in the same slot is the same as the above configuration. The head of each symbol has exactly the same PTRS sequence, and the tail of each symbol has exactly the same PTRS sequence. Since the channel experienced by the OFDM symbol in a first slot and the channel experienced by the OFDM in a second slot have different noise, that is, the noise of the former is less than that of the latter, the second OFDM symbol is additionally added with an intermediate PTRS. The head PTRS of the first OFDM symbol is the same as the head PTRS of the second OFDM symbol. The tail PTRS of the first OFDM symbol is the same as the tail PTRS of the second OFDM symbol.

In an embodiment, the modulation manner of the head and tail PTRSs is the same as the modulation manner of the PTRS in the middle. In another embodiment, the modulation manner of the head and tail PTRSs is different from the modulation manner of the PTRS in the middle.

Figure 6:
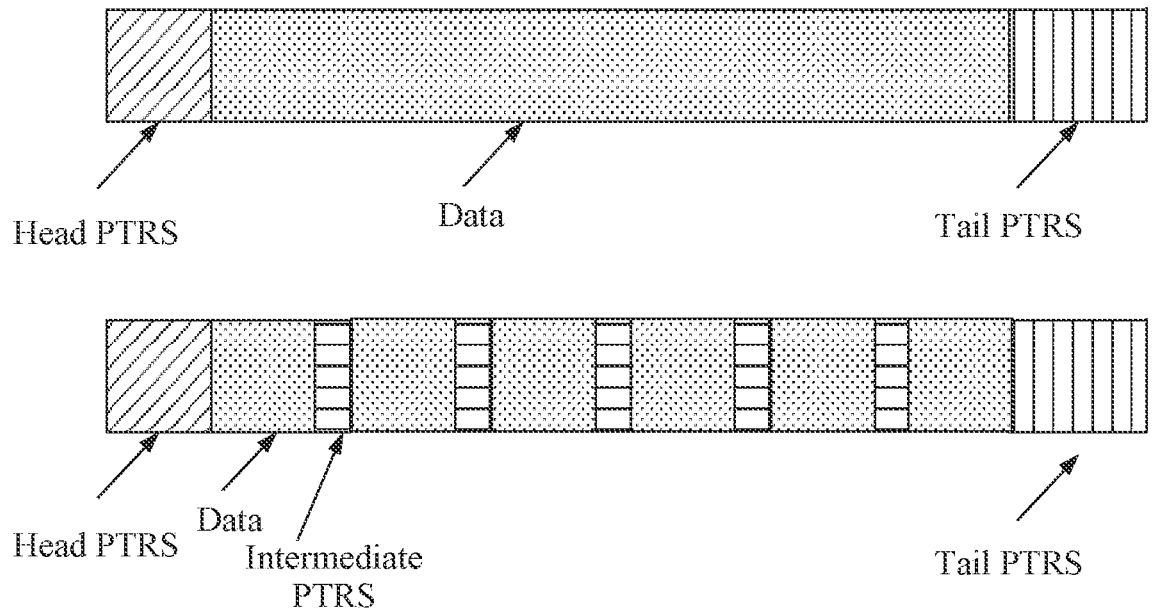
FIG. 6 is a diagram showing the configuration scheme of PTRSs of two OFDM symbols in different slots according to an embodiment of the present application.

In an applicable embodiment. FIG. 6 is a diagram showing the configuration scheme of PTRSs of two OFDM symbols in different slots according to an embodiment of the present application. Since an experienced channel is a fading channel having a certain multipath delay, and there is certain phase noise at a sending end and a receiving end, a consecutive section of PTRS is configured at each of the head and the tail, respectively. A first OFDM symbol has data in the middle, and no intermediate PTRS is configured. There are seven PTRS blocks in the middle of a second OFDM symbol, that is. A=7. Moreover, the configuration of other OFDM symbols in the same slot is the same as the above configuration. The head of each symbol has exactly the same PTRS sequence, and the tail of each symbol has exactly the same PTRS sequence. Since the phase noise to which the OFDM symbol in a first slot is subjected and the phase noise to which the OFDM symbol in a second slot is subjected are different, that is, the phase noise of the former is less than that of the latter, the second OFDM symbol is additionally added with packeted intermediate PTRSs. The head PTRS of the first OFDM symbol is the same as the head PTRS of the second OFDM symbol. The tail PTRS of the first OFDM symbol is the same as the tail PTRS of the second OFDM symbol.

In an embodiment, intermediate PTRSs may also be unevenly distributed.

Figure 7:
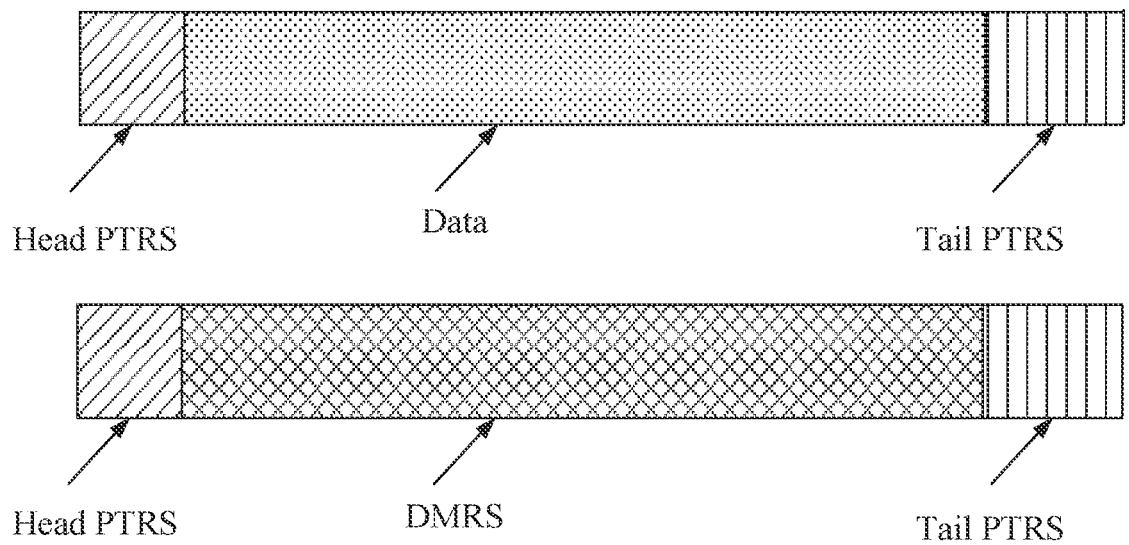
FIG. 7 is a diagram showing the configuration scheme of PTRSs of one OFDM symbol and one DMRS in the same slot according to an embodiment of the present application.

In an applicable embodiment, FIG. 7 is a diagram showing the configuration scheme of PTRSs of one OFDM symbol and one DMRS in the same slot according to an embodiment of the present application. Since an experienced channel is a fading channel having a certain multipath delay, and there is certain phase noise at the sending end and the receiving end, a consecutive section of PTRS is configured at each of the head and the tail, respectively. The intermediate portion is data, and no intermediate PTRS is configured. The head sequence in the DMRS and the head PTRS sequence in the OFDM data symbol are the same. The tail sequence in the DMRS and the tail PTRS sequence in the OFDM data symbol are the same. The head PTRS and the tail PTRS are part of the DMRS symbol. If a DMRS reference signal is generated in the frequency domain, a time domain reference signal is a time domain sequence obtained by performing an IFFT on a frequency domain DMRS.

Figure 8:
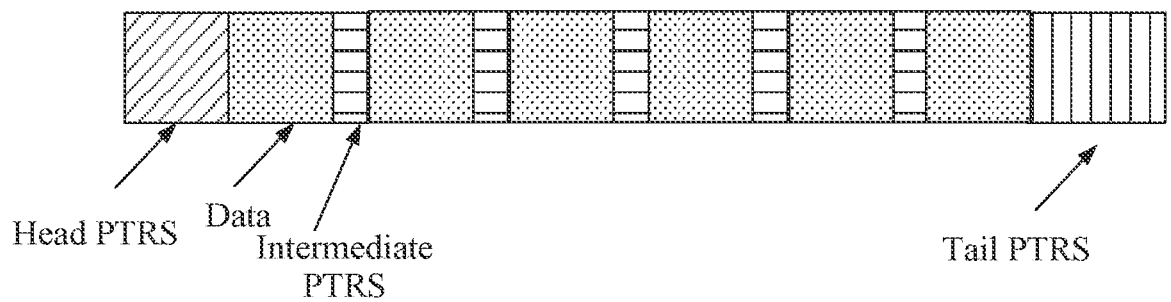
FIG. 8 is a diagram showing the configuration scheme of PTRSs of one OFDM symbol according to an embodiment of the present application.

In an applicable embodiment. FIG. 8 is a diagram showing the configuration scheme of PTRSs of one OFDM symbol according to an embodiment of the present application. Since an experienced channel is a fading channel having a certain multipath delay, and there is certain phase noise at a sending end and a receiving end, a consecutive section of PTRSs is configured at each of the head and the tail, respectively. The intermediate portion is data, and A=7. Moreover, the configuration of other OFDM symbols in the same slot is the same as the above configuration. The head of each symbol has exactly the same PTRS sequence, and the tail of each symbol has exactly the same PTRS sequence. The modulation manner of the data is QPSK. The modulation manner of the intermediate PTRS is also QPSK. In addition, the modulation manner of the intermediate PTRS may not be the same as the modulation manner of the data. That is, the modulation manner of the intermediate PTRS is a fixed modulation manner, such as pi/2 BPSK. Moreover, the modulation manner is set at the sending end and does not vary with the data.

Figure 9:
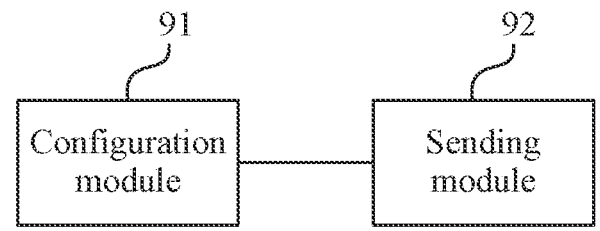
FIG. 9 is a diagram illustrating the structure of a PTRS configuration apparatus according to an embodiment of the present application.

In an embodiment, a PTRS configuration apparatus is provided. The PTRS configuration apparatus is applicable in scenarios where phase noise is suppressed at high frequencies. As shown in FIG. 9, the PTRS configuration apparatus provided in this embodiment of the present application mainly includes a configuration module 91 and a sending module 92.

The configuration module 91 is configured to unevenly configure at least two phase tracking reference signal (PTRS) blocks in a time domain symbol. Each PTRS block includes one or more PTRSs.

The sending module 92 is configured to send configured PTRSs to a second node.

According to the phase tracking reference signal configuration apparatus provided in this embodiment of the present application, at least two phase tracking reference signal (PTRS) blocks are unevenly configured in the time domain symbol, where each PTRS block includes one or more PTRSs; and the configured PTRS blocks are sent to the second node. Thus, the effect of phase noise is suppressed without affecting the spectral efficiency of a system and with a low peak-to-average power ratio (PAPR).

In an example embodiment, the at least two phase tracking reference signal (PTRS) blocks include a first PTRS block and a second PTRS block.

In an example embodiment, the at least two phase tracking reference signal (PTRS) blocks include a first PTRS block, a second PTRS block, and a third PTRS block.

In an example embodiment, the first PTRS block is configured at the head of the time domain symbol. The second PTRS block is configured at the tail of the time domain symbol.

In an example embodiment, PTRSs in the first PTRS block and PTRSs in the second PTRS block are both consecutively arranged.

In an example embodiment, when multiple time domain symbols are included in a preset time domain range, the first PTRS block in each time domain symbol includes the same PTRS sequence. The second PTRS block in each time domain symbol includes the same PTRS sequence.

In an example embodiment, the PTRS sequence in the first PTRS block is the same as the head sequence of a time domain reference signal. The PTRS sequence in the second PTRS block is the same as the tail sequence of the time domain reference signal.

In an example embodiment, when the time domain reference signal is defined in a frequency domain, the PTRS sequence in the first PTRS block is the same as the head sequence of a time domain reference signal obtained by performing an IFFT on a frequency domain reference signal. The PTRS sequence in the second PTRS block is the same as the tail sequence of the time domain reference signal obtained by performing an IFFT on the frequency domain reference signal.

In an example embodiment, the number of PTRSs in the first PTRS block is proportional to the length of a time domain symbol. The number of PTRSs in the second PTRS block is determined by the fading channel multipath delay.

In an example embodiment, the number of PTRSs in the second PTRS block is greater than the number of PTRSs in the first PTRS block.

In an example embodiment, the PTRSs in the third PTRS block are discretely distributed in the data of the time domain symbol.

In an example embodiment, PTRSs in the third PTRS block are evenly distributed in the data of the time domain symbol other than the first PTRS block and the second PTRS block.

In an example embodiment, in the case where the third PTRS block includes multiple PTRSs, one or more sub-blocks of the same length are included in the third PTRS block. Each sub-block includes one or more PTRSs.

The one or more sub-blocks are evenly distributed in time domain data.

In an example embodiment, the number of sub-blocks included in one third PTRS block and the number of PTRSs in each sub-block are determined by one or more parameters of the following: the magnitude of phase noise to which data is subjected, the change rate of phase noise to which data is subjected, the magnitude of white Gaussian noise to which data is subjected, or the change rate of white Gaussian noise to which data is subjected.

In an example embodiment, the PTRS sequence modulation manner in the third PTRS block is the same as the data modulation manner in the time domain symbol.

In an example embodiment, the modulation manner includes one or more of the following: a binary phase-shift keying (BPSK) modulation manner, a pi/2 BPSK modulation manner, a quadrature phase-shift keying (QPSK) modulation manner, or a 16 quadrature amplitude modulation (16-QAM) manner.

The PTRS configuration apparatus provided in this embodiment can execute the PTRS configuration method provided in any embodiment of the present application and has corresponding functional modules for executing the method. For technical details not described in detail in this embodiment, reference may be made to the PTRS configuration method provided in any embodiment of the present application.

It is to be noted that units and modules involved in the embodiment of the preceding PTRS configuration apparatus are just divided according to functional logic, and the division is not limited to this, as long as the corresponding functions can be implemented. In addition, specific names of functional units are just intended for distinguishing and are not to limit the protection scope of the present application.

Figure 10:
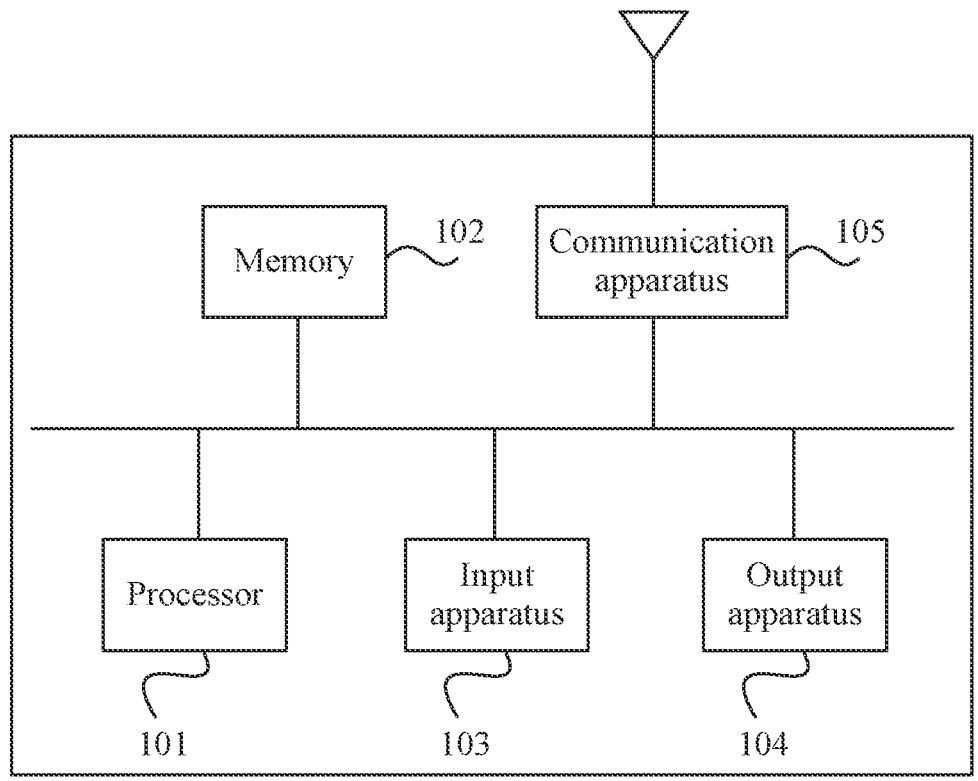
FIG. 10 is a diagram illustrating the structure of a signal configuration device according to an embodiment of the present application.

An embodiment of the present application also provides a signal configuration device. FIG. 10 is a diagram illustrating the structure of a phase tracking reference signal configuration device according to an embodiment of the present application. As shown in FIG. 10, the device includes a processor 101, a memory 102, an input apparatus 103, an output apparatus 104, and a communication apparatus 105. One or more processors 101 may be disposed in the device. One processor 101 is taken as an example in FIG. 10. The processor 101, the memory 102, the input apparatus 103, and the output apparatus 104 in the device may be connected by a bus or in other manners. The connection via a bus is shown as an example in FIG. 10.

As a computer-readable storage medium, the memory 102 may be configured to store software programs, computer-executable programs, and modules such as program instructions/modules corresponding to the PTRS configuration method in the embodiments of the present application (for example, the configuration module 91 and the sending module 92 in the PTRS configuration apparatus). The processor 101 runs the software programs, instructions, and modules stored in the memory 102 to execute function applications and data processing of the device, that is, to implement any method provided in any embodiment of the present application.

The memory 102 may mainly include a program storage region and a data storage region. The program storage region may store an operating system and an application program required by at least one function. The data storage region may store data created depending on the device's usage. Additionally, the memory 102 may include a high-speed random-access memory and may also include a nonvolatile memory such as at least one disk memory, a flash memory, or another nonvolatile solid-state memory. In some examples, the memory 102 may further include memories located remotely relative to the processor 101. These remote memories may be connected to the device via a network. Examples of the preceding network include, but are not limited to, the Internet, an intranet, a local area network, a mobile communication network, and a combination thereof.

The input apparatus 103 may be configured to receive inputted digital or character information and generate key signal input related to user settings and function control of the device. The output apparatus 104 may include a display device, such as a display screen.

The communication apparatus 105 may include a receiver and a sender. The communication apparatus 105 is configured to perform information transceiving communication under the control of the processor 101.

In an example embodiment, an embodiment of the present application also provides a storage medium containing computer-executable instructions. The computer-executable instructions are used for executing a phase tracking reference signal configuration method when executed by a computer processor. The method is applied by a first node. The method includes unevenly configuring at least two phase tracking reference signal (PTRS) blocks in a time domain symbol, where each PTRS block includes one or more PTRSs; and sending configured PTRSs to a second node.

Of course, in the storage medium containing computer-executable instructions provided in the embodiments of the present application, the computer-executable instructions execute not only the preceding method operations but also related operations in the PTRS configuration method provided in any embodiment of the present application.

From the preceding description of embodiments, it is apparent to those skilled in the art that the present application may be implemented by relying on software and necessary general-purpose hardware or may be implemented by hardware. Based on this understanding, the technical solutions provided in the present application substantially, or the part contributing to the related art, may be embodied in the form of a software product. The software product may be stored in a computer-readable storage medium, such as a computer floppy disk, a read-only memory (ROM), a random-access memory (RAM), a flash, a hard disk, or an optical disc, and includes several instructions for enabling a computer device (which may be a personal computer, a server, or a network device) to execute the method according to each embodiment of the present application.

The preceding are only example embodiments of the present application and are not intended to limit the scope of the present application.

It is to be understood by those skilled in the art that the term "user terminal" covers any suitable type of radio UE, for example, a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in the memory: The memory may be of any type suitable for a local technical environment and may be implemented by using any suitable data storage technology, such as, but not limited to, a read-only memory (ROM), a random-access memory (RAM) and an optical memory apparatus and system (a digital video disc (DVD) or a compact disc (CD)). The computer-readable medium may include a non-transitory storage medium. The data processor may be of any type suitable to the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A signal configuration method, applied by a first node, comprising:
    unevenly configuring at least two phase tracking reference signal (PTRS) blocks in a time domain symbol, wherein each of the at least two PTRS blocks comprises at least one PTRS, and the at least two PTRS blocks comprise a first PTRS block and a second PTRS block; and
    sending configured PTRSs to a second node;
    wherein the first PTRS block is configured at a head of the time domain symbol, and the second PTRS block is configured at a tail of the time domain symbol; and
    wherein a PTRS sequence in the first PTRS block is the same as a head sequence of a time domain reference signal, and a PTRS sequence in the second PTRS block is the same as a tail sequence of the time domain reference signal.

2. The method according to claim 1, wherein the at least two PTRS blocks further comprise a third PTRS block.

3. The method according to claim 1, wherein PTRSs in the first PTRS block are consecutively arranged, and PTRSs in the second PTRS block are consecutively arranged.

4. The method according to claim 1, wherein in response to a plurality of time domain symbols are comprised in a preset time domain range, the first PTRS block in each of the plurality of time domain symbols comprises a same PTRS sequence, and the second PTRS block in the each of the plurality of time domain symbols comprises a same PTRS sequence.

5. The method according to claim 1, wherein in response to the time domain reference signal being defined in a frequency domain, the PTRS sequence in the first PTRS block is the same as a head sequence of a time domain reference signal obtained by performing an inverse fast Fourier transform (IFFT) on a frequency domain reference signal, and the PTRS sequence in the second PTRS block is the same as a tail sequence of the time domain reference signal obtained by performing an IFFT on the frequency domain reference signal.

6. The method according to claim 1, wherein
    a number of PTRSs in the first PTRS block is proportional to a length of the time domain symbol; and
    a number of PTRSs in the second PTRS block is determined by fading channel multipath delay.

7. The method according to claim 6, wherein the number of PTRSs in the second PTRS block is greater than the number of PTRSs in the first PTRS block.

8. The method according to claim 2, wherein PTRSs in the third PTRS block are discretely distributed in data of the time domain symbol.

9. The method according to claim 2, wherein PTRSs in the third PTRS block are evenly distributed in data of the time domain symbol other than the first PTRS block and the second PTRS block.

10. The method according to claim 2, wherein in a case where the third PTRS block comprises a plurality of PTRSs, at least one sub-block of a same length is comprised in the third PTRS block, and each of the at least one sub-block comprises at least one PTRS, wherein
the at least one sub-block is evenly distributed in time domain data.

11. The method according to claim 10, wherein the number of sub-blocks comprised in one third PTRS block and the number of PTRSs in the each of the at least one sub-block are determined by at least one of following parameters:
a magnitude of phase noise to which data is subjected, a change rate of phase noise to which data is subjected, or a magnitude of white Gaussian noise to which data is subjected.

12. The method according to claim 2, wherein a PTRS sequence modulation manner in the third PTRS block is the same as a data modulation manner of the time domain symbol.

13. The method according to claim 12, wherein the modulation manner comprises at least one of the following:
a binary phase-shift keying (BPSK) modulation manner, a pi/2 BPSK modulation manner, a quadrature phase-shift keying (QPSK) modulation manner, or a 16 quadrature amplitude modulation (16-QAM) manner.

14. The method according to claim 2, wherein the first PTRS block is configured at a head of the time domain symbol, and the second PTRS block is configured at a tail of the time domain symbol.

15. The method according to claim 2, wherein PTRSs in the first PTRS block are consecutively arranged, and PTRSs in the second PTRS block are consecutively arranged.

16. A signal configuration device, comprising:
at least one processor; and
a memory configured to store at least one program,
wherein when executed by the at least one processor, the at least one program causes the at least one processor to implement the following steps:
unevenly configuring at least two phase tracking reference signal (PTRS) blocks in a time domain symbol, wherein each of the at least two PTRS blocks comprises at least one PTRS, and the at least two PTRS blocks comprise a first PTRS block and a second PTRS block; and
sending configured PTRSs to a second node; wherein the first PTRS block is configured at a head of the time domain symbol, and the second PTRS block is configured at a tail of the time domain symbol; and
wherein a PTRS sequence in the first PTRS block is the same as a head sequence of a time domain reference signal, and a PTRS sequence in the second PTRS block is the same as a tail sequence of the time domain reference signal.

17. A non-transitory storage medium, storing a computer program which, when executed by a processor, implements the following steps:
unevenly configuring at least two phase tracking reference signal (PTRS) blocks in a time domain symbol, wherein each of the at least two PTRS blocks comprises at least one PTRS, and the at least two PTRS blocks comprise a first PTRS block and a second PTRS block; and
sending configured PTRSs to a second node;
wherein the first PTRS block is configured at a head of the time domain symbol, and the second PTRS block is configured at a tail of the time domain symbol; and
wherein a PTRS sequence in the first PTRS block is the same as a head sequence of a time domain reference signal, and a PTRS sequence in the second PTRS block is the same as a tail sequence of the time domain reference signal.

* * * * *